United States Patent Office 3,499,895
Patented Mar. 10, 1970

---

3,499,895
5H-INDENO[1,2-c]PYRIDINE-5-ONES
Ernst Jucker, Ettingen, Anton Ebnother, Reinach, Basel-Land, and Jean-Michel Bastian, Birsfelden, Switzerland, assignors to Sandoz Ltd. (also known as Sandoz A.G.), Basel, Switzerland
No Drawing. Filed June 21, 1967, Ser. No. 647,626
Claims priority, application Switzerland, June 23, 1966, 9,127/66; Feb. 28, 1967, 2,910/67
Int. Cl. C07d 87/38, 39/00, 27/04
U.S. Cl. 260—247.5       7 Claims

ABSTRACT OF THE DISCLOSURE

The present invention provides compounds of formula:

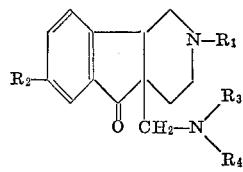

in which $R_1$ is lower alkyl, $R_2$ is hydrogen, chlorine or lower alkyl, and each of $R_3$ and $R_4$ is lower alkyl, or together with the nitrogen they are 1-pyrrolidinyl, piperidino, morpholino or 4-methyl-1-piperazinyl, and a pharmaceutically acceptable acid addition salt thereof. The compounds exhibit pronounced analgesic effects, and furthermore have certain sedative properties and exhibit a pronounced blood pressure lowering effect on hypertonic animals. The production of these compounds is furthermore described.

---

The present invention relates to new indenopyridine derivatives and a process for their production.

The present invention provides indenopyridine derivatives of Formula I,

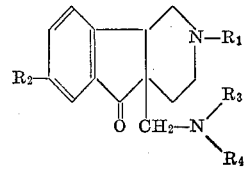

in which:

$R_1$ signifies a lower alkyl radical, $R_2$ signifies a hydrogen or chlorine atom or a lower alkyl radical, and each of $R_3$ and $R_4$ signifies a lower alkyl radical or together with the nitrogen atom to which they are attached, they signify a 1-pyrrolidinyl, piperidino, morpholino or 4-methyl-1-piperazinyl radical, and their acid addition salts.

The present invention further provides a process for the production of compounds I and their acid addition slats, characterized in that a ketone of Formula II,

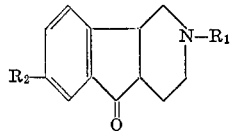

in which $R_1$ and $R_2$ have the above significance, is reacted with formaldehyde and an amine of Formula III,

in which $R_3$ and $R_4$ have the above significance, under Mannich reaction conditions, and when an acid addition salt is required, salification is effected.

2-methyl-1,2,3,4,4a,9b-hexahydro - 5H - indeno[1,2-c]pyridin-5-one, 2,7-dimethyl-1,2,3,4,4a,9b-hexahydro-5H-indeno[1,2-c]pyridin-5-one, 7-chloro-2-methyl-1,2,3,4,4a,9b-hexahydro-5H-indeno[1,2-c]pyridin-5-one may, for example, be used as the ketone of Formula II and dimethylamine, piperidine, pyrrolidine or morpholine as the amine of Formula III. A lower alkanol, e.g. ethanol, is preferably used as solvent for the reaction.

The formaldehyde is advantageously used in the polymerized form, paraformaldehyde, preferably an excess, as part of it is lost by acetal formation with the alkanol used as solvent. The reaction is preferably effected in the presence of a mineral acid, as the depolymerization of the paraformaldehyde is accelerated under these conditions. For this purpose the amine of Formula III is used in the form of an acid addition salt, e.g. as hydrochloride, and/or a mineral acid, e.g. hydrochloric acid, is added to the reaction solution.

One method of effecting the process of the invention is as follows:

An amine of Formula III—in the form of the free base or the hydrochloride—is heated to the boil at reflux with paraformaldehyde and a ketone of Formula II in a mixture of ethanol and concentrated hydrochloric acid for 1 to 2 hours. A further portion of paraformaldehyde is subsequently added and heating to the boil is continued for some time, e.g. 2 hours. In most cases the dihydrochloride of the resulting compound I crystallizes from the cooled reaction mixture and may be filtered off; when no crystallization occurs, the reaction solution is evaporated until crystallization commences, or to dryness. The crude product which is filtered off or obtained as residue may be purified in manner known per se, e.g. by crystallization from a suitable solvent, e.g. methanol or ethanol.

The compounds of Formula I are basic compounds; with inorganic or organic acids they form stable salts which are crystalline at room temperature. Examples of acids for acid addition salt formation are: hydrochloric, hydrobromic, sulphuric, malonic, succinic, fumaric, hydrogenfumaric, maleic, tartaric, methanesulphonic, p-toluenesulphonic, naphthalene-1,5-disulphonic and cyclohexylsulphamic acid.

Only some of the ketones of Formula II used as starting materials are known; they may, for example, be produced as follows:

A tetrahydro-isonicotinic acid ester of Formula IV,

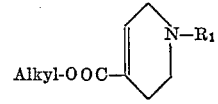

in which $R_1$ has the above significance, is subjected to a Grignard reaction with an organic magnesium compound of Formula V,

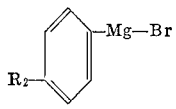

in which $R_2$ has the above significance, the reaction product is hydrolyzed and the resulting compound of Formula VI,

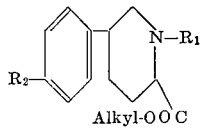

in which $R_1$ and $R_2$ have the above significance, is cyclized with polyphosphoric acid. Cyclization, may however, also be effected in that the ester of Formula VI is hydrolysed to the free acid, which is then converted to the acid chloride and this is cyclized with anhydrous aluminium chloride.

The compounds of Formula I have hitherto not been described in the literature; they have valuable pharmacodynamic properties. Thus, they exhibit pronounced analgesic effects as has been ascertained in mice and monkeys. They furthermore have certain sedative properties and exhibit a pronounced blood pressure lowering effect on hypertonic animals (Grollmann rats), without exerting a substantial influence on the blood pressure of normotonic animals. Their toxicity is relatively low.

The compounds of the invention are, therefore, indicated for use as analgesics in the treatment of pain; they may also be used in internal medicine in the treatment of hypertonia and in psychiatry in the treatment of neurotic and psychotic disorders.

A suitable daily average dose of compounds I is 1–100 mg. administered in 1 to 4 portions.

The compounds of Formula I or their physiologically tolerated, water-soluble salts may be used as pharmaceuticals on their own or in the form of appropriate medicinal preparations, e.g. tablets, dragées, injectable solutions and suppositories, for administration, e.g. enterally or parenterally. Aside from the usual inorganic and organic physiologically acceptable adjuvants, e.g. lactose, starch, talcum, stearic acid, water, alcohols, glycerin, natural or hardened oils and waxes, the preparations may furthermore contain suitable preserving, stabilizing and wetting agents, solubilizers, sweetening and colouring substances and flavourings.

The term "in manner known per se" as used herein designates methods in use or described in the literature on the subject.

As used herein, the term "lower alkyl" designates alkyl radicals containing from 1 to 4 carbon atoms inclusive.

In the following non-limitative examples all temperatures are indicated in degrees centigrade and are uncorrected.

EXAMPLE 1

4a-dimethylaminomethyl-2-methyl-1,2,3,4,4a,9b-hexahydro-5H-indeno[1,2-c]pyridin-5-one 5.4 g. of dimethylamine hydrochloride and 2.7 g. of paraformaldehyde are added to a solution of 12 g. of 2 - methyl - 1,2,3,4,4a,9b - hexahydro-5H-indeno[1,2-c] pyridin-5-one in 30 ml. of ethanol and 6 ml. of concentrated hydrochloric acid. Heating to the boil is effected for one hour, a further 1.8 g. of paraformaldehyde are added and heating is effected for a further 2 hours. After cooling, the precipitated dihydrochloride of the compound indicated in the heading is filtered off and recrystallized from water/ethanol (1:6). The compound slowly takes a brown colour upon heating over 200° and has a melting point of 245–246° with decomposition.

EXAMPLE 2

7-chloro-4a-dimethylaminomethyl-2-methyl-1,2,3,4,4a,9b-hexahydro-5H-indeno[1,2-c]pyridin-5-one 4.5 g. of dimethylamine hydrochloride and 2.3 g. of paraformaldehyde are added to a solution of 11.8 g. of 7-chloro-2-methyl - 1,2,3,4,4a,9b - hexahydro-5H-indeno [1,2-c]pyridin-5-one in 25 ml. of ethanol and 6 ml. of concentrated hydrochloric acid. Heating to the boil at reflux is effected for one hour, a further 1.5 g. of paraformaldehyde are added and heating is effected for a further 2 hours. After cooling the reaction mixture, the precipitated dihydrochloride of the compound indicated in the heading is filtered off and recrystallized from water/ethanol and then from methanol. Melting point 230–235° (decomposition).

EXAMPLE 3

2-methyl-4a-piperidinomethyl-1,2,3,4,4a,9b-hexahydro-5H-indeno[1,2-c]pyridin-5-one 11 ml. of concentrated hydrochloric acid are added dropwise at 20° to a solution of 10 g. of 2 - methyl-1,2,3,4,4a,9b - hexahydro-5H-indeno[1,2-c]pyridin-5-one and 4.25 g. of piperidine in 30 ml. of ethanol. 2.25 g. of paraformaldehyde are subsequently added, heating to the boil at reflux is effected for 1½ hours, a further 1.5 g. of paraformaldehyde are added and heating is effected for a further 1½ hours. The reaction solution is concentrated by evaporation in a vacuum and the viscous residue is triturated with 50 ml. of acetone until crystallization commences. After some time, the precipitated dihydrochloride of the compound indicated in the heading is filtered off and recrystallized twice from methanol/ethanol (1:4). Melting point 215–220° (decomposition).

EXAMPLE 4

2-methyl-4a-morpholinomethyl-1,2,3,4,4a,9b-hexahydro-5H-indeno[1,2-c]pyridin-5-one The process is effected in a manner analogous to that described in Example 3, except that 4.8 g. of morpholine are used in place of piperidine. After crystallization from methanol the dihydrochloride of the compound indicated in the heading has a melting point of 210–215° (decomposition).

EXAMPLE 5

2-methyl-4a-(1-pyrrolidinyl)methyl-1,2,3,4,4a,9b-hexahydro-5H-indeno[1,2-c]pyridin-5-one The process is effected in a manner analogous to that described in Example 3, except that 3.9 g. of pyrrolidine are used in place of piperidine. After crystallization from methanol the dihydrochloride of the compound indicated in the heading has a melting point of 225–230° (decomposition).

After crystallization from pentane the base liberated from the dihydrochloride has a melting point of 59–61°.

EXAMPLE 6

2,7-dimethyl-4a-dimethylaminomethyl-1,2,3,4,4a,9b-hexahydro-5H-indeno[1,2-c]pyridin-5-one 4.5 g. of dimethylamine hydrochloride and 2.3 g. of paraformaldehyde are added to a solution of 10.8 g. of 2,7 - dimethyl-1,2,3,4,4a,9b-hexahydro-5H-indeno[1,2-c] pyridin-5-one in 30 ml. of ethanol and 6 ml. of concentraed hydrochloric acid, and the mixture is heated at reflux for 1 hour. A further 1.5 g. of paraformaldehyde are then added, and the mixture is heated for a further 2 hours at reflux. After cooling the reaction mixture, the precipitated hydrochloride of the title compound is filtered off and recrystallized twice from methanol. Melting point 230–234° (decomp.).

EXAMPLE 7

| Galenical preparation | Tablets, g.[1] |
|---|---|
| 4a-dimethylaminomethyl-2-methyl-1,2,3,4,4a, 9b-hexahydro - 5H-indeno[1,2-c]pyridin-5-one hydrochloride (compound of Example 1) | 0.0229 |
| Magnesium stearate | 0.0010 |
| Polyvinyl pyrrolidone | 0.0040 |
| Talcum | 0.0080 |
| Maize starch | 0.010 |
| Lactose | 0.1106 |
| Dimethyl silicone oil | 0.0005 |
| Polyethylene glycol 6000 | 0.0030 |
| For a tablet of | 0.160 |

[1] Corresponds to 20 mg. of the free base.

What is claimed is:

1. A compound selected from the group consisting of a compound of formula:

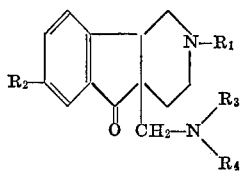

in which $R_1$ is lower alkyl, $R_2$ is hydrogen, chlorine or lower alkyl, and each of $R_3$ and $R_4$ is lower alkyl, or together with the nitrogen they are 1-pyrrolidinyl, piperidino, morpholino or 4-methyl-1-piperazinyl, and a pharmaceutically acceptable acid addition salt thereof.

2. A compound according to claim 1, in which the compound is 4a-dimethylaminomethyl-2-methyl-1,2,3,4, 4a,9b-hexahydro-5H-indeno[1,2-c]pyridin-5-one.

3. A compound according to claim 1, in which the compound is 7-chloro-4a-dimethylaminomethyl-2-methyl-1,2,3,4,4a,9b-hexahydro-5H-indeno[1,2-c]pyridin-5-one.

4. A compound according to claim 1, in which the compound is 2-methyl-4a-piperidinomethyl-1,2,3,4,4a,9b-hexahydro-5H-indeno[1,2-c]pyridin-5-one.

5. A compound according to claim 1, in which the compound is 2-methyl-4a-morpholinomethyl-1,2,3,4,4a, 9b-hexahydro-5H-indeno[1,2-c]pyridin-5-one.

6. A compound according to claim 1, in which the compound is 2-methyl-4a-(1-pyrrolidinyl)methyl-1,2,3,4, 4a,9b-hexahydro-5H-indeno[1,2-c]pyridin-5-one.

7. A compound according to claim 1, in which the compound is 2,7-dimethyl-4a-dimethylaminomethyl-1,2,3, 4,9a,9b-hexahydro-5H-indeno-[1,2-c]pyridin-5-one.

No references cited.

ALEX MAZEL, Primary Examiner

J. TOVAR, Assistant Examiner

U.S. Cl. X.R.

260—294.7, 268; 424—248, 250, 267